United States Patent
Bommireddi

(10) Patent No.: US 10,409,564 B2
(45) Date of Patent: Sep. 10, 2019

(54) RECORDING AND PLAYBACK OF DEVELOPMENT SESSIONS

(71) Applicant: Microsoft Technology Licensing, LLC, Redmond, WA (US)

(72) Inventor: Sandeep Bommireddi, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 14/817,131

(22) Filed: Aug. 3, 2015

(65) Prior Publication Data
US 2017/0039041 A1    Feb. 9, 2017

(51) Int. Cl.
| G06F 9/44 | (2018.01) |
| G06F 8/36 | (2018.01) |
| G11B 27/031 | (2006.01) |
| G11B 27/34 | (2006.01) |
| G06F 8/34 | (2018.01) |
| G06F 11/36 | (2006.01) |
| G06F 8/33 | (2018.01) |
| G06F 9/451 | (2018.01) |

(52) U.S. Cl.
CPC .................. G06F 8/36 (2013.01); G06F 8/33 (2013.01); G06F 8/34 (2013.01); G06F 9/453 (2018.02); G06F 11/3664 (2013.01); G11B 27/031 (2013.01); G11B 27/34 (2013.01)

(58) Field of Classification Search
CPC .................................... G06F 8/34; G06F 11/36
See application file for complete search history.

(56) References Cited

U.S. PATENT DOCUMENTS

| 5,801,687 | A | * | 9/1998 | Peterson | ................ | G11B 27/34 345/440 |
| 6,226,785 | B1 | * | 5/2001 | Peterson | .............. | G11B 27/034 717/106 |

(Continued)

FOREIGN PATENT DOCUMENTS

WO    2008055005 A2    5/2008

OTHER PUBLICATIONS

Zhang et al. (SmartTutor: Creating IDE-based Interactive Tutorials via Editable Replay, May 2009) (Year: 2009).*

(Continued)

*Primary Examiner* — Chat C Do
*Assistant Examiner* — Lenin Paulino
(74) *Attorney, Agent, or Firm* — Rainier Patents, P.S.

(57) ABSTRACT

This document relates to recording and replay of actions taken in a development tool, such as those used for developing software. One example includes a hardware processing unit and a development environment plug-in configured to be loaded by a development environment that provides application programming interfaces to the development environment plug-in. When loaded into the development environment, the development environment plug-in is further configured to execute on the hardware processing unit, retrieve a recorded representation of a previous development session that identifies recorded development actions from the previous development session, and cause the previous development session to be replayed in the development environment by calling the application programming interfaces provided by the development environment.

20 Claims, 17 Drawing Sheets

(56) References Cited

U.S. PATENT DOCUMENTS

| | | | |
|---|---|---|---|
| 6,674,447 B1 | 1/2004 | Chiang et al. | |
| 7,099,893 B2 | 8/2006 | Bischof et al. | |
| 7,213,051 B2 | 5/2007 | Zhu et al. | |
| 7,299,281 B1 | 11/2007 | Wang et al. | |
| 7,506,318 B1* | 3/2009 | Lindo | G06F 11/3644 717/130 |
| 7,653,896 B2 | 1/2010 | Herdeg, III | |
| 8,340,130 B2 | 12/2012 | Mazzaferri | |
| 2002/0002562 A1* | 1/2002 | Moran | G06F 17/30017 715/203 |
| 2007/0067373 A1* | 3/2007 | Higgins | G06F 11/3013 |
| 2007/0255767 A1 | 11/2007 | Kikuchi | |
| 2008/0244418 A1* | 10/2008 | Manolescu | G06Q 10/00 715/753 |
| 2009/0199163 A1* | 8/2009 | Soroker | G06F 8/20 717/128 |
| 2010/0269096 A1* | 10/2010 | Araya | G06F 8/71 717/113 |
| 2011/0289117 A1 | 11/2011 | Agrawal et al. | |
| 2013/0212562 A1* | 8/2013 | Fox | G06F 8/65 717/120 |
| 2013/0263090 A1* | 10/2013 | Polk | G06F 11/3672 717/124 |
| 2014/0149496 A1 | 5/2014 | Lee et al. | |
| 2014/0212107 A1* | 7/2014 | Saint-Jean | G11B 27/031 386/241 |
| 2016/0217058 A1* | 7/2016 | Kidron | G06F 9/543 |
| 2016/0260339 A1* | 9/2016 | Subashchandrabose | G09B 5/125 |

OTHER PUBLICATIONS

Response and Demand filed Dec. 21, 2016 to PCT Patent Application No. PCT/US2016/044603, 15 pages.

"Hangouts on Air Apps", Published on: Apr. 6, 2015, Online Retrieved Apr. 21, 2015; Available at: <<https://support.google.com/plus/answer/2660854?hl=en>>, 2 Pages.

Khetawat, et al., "Recording and Playback of Collaborative Desktops on the Internet", In Technical Report 1997-TR@CBL-06-Khetawat, Oct. 1997, 8 pages.

Pongnumkul, et al., "Pause-and-Play: Automatically Linking Screencast Video Tutorials with Applications", In Proceedings of ACM Symposium on User Interface Software and Technology, Oct. 16, 2011, 10 pages.

Mrsgeek, "Our First Webinar with Google Hangouts on Air", Published on: Dec. 11, 2013, Online Retrieved Apr. 21, 2015; Available at: <<http://geeksontour.tv/2013/12/our-first-webinar-with-google-hangouts-on-air/>>; 3 Pages.

International Search Report and Written Opinion dated Nov. 9, 2016 from PCT Patent Application No. PCT/US2016/044603, 12 pages.

"International Preliminary Report on Patentability Issued in PCT Application No. PCT/US2016/044603", dated Nov. 17, 2017, 10 Pages.

* cited by examiner

Method 200

| Session Representation 300 ||||
|---|---|---|---|
| Time 302 | Audio Data 304 | Development Actions 306 | Index 308 |
| 0-30 | "Here I have declared ..." | text - using System; | System namespace |
| 31-60 | "Now I will tell ..." | text - namespace HelloWorld; | HelloWorld namespace |
| 61-90 | "Within the ..." | text - class Hello | Hello class |
| 91-120 | "The Hello class ..." | text - static void Main() | Main() function |
| 121-150 | "Now we can ..." | text - Console.Writeline("Hello world!") | Console.Writeline() function |
| 151-180 | "Next we build ..." | command - Build | n/a |
| 181-210 | "To run our ..." | command - Start | n/a |
| 211-240 | "The program runs ..." | n/a | n/a |

```
Edit   View   Project   Build   Debug   Term   Tools   Test   Analyze   Window
                                        Debug ▽   Any CPU ▽   ▷ Start HelloWorld.cs
C# HelloWorldApplication
    using System;
    namespace HelloWorld
    {
        class Hello
        {
            static void Main()
            {
                int i = 0;
                i = i++;
```

400
1402
402

Output
Show Output from Build

RECORDING AND PLAYBACK OF DEVELOPMENT SESSIONS

BACKGROUND

Development tools are often used to develop software. For example, development tools can include compilers, code editors, debuggers, and other associated code-development tools, as well as source control and versioning systems. Typically, users learn how to use development tools in a classroom or online learning experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to recording and replay of actions taken in a development tool, such as those used for developing software. One example is a method or technique that can be performed by a computing device. The example includes, during a first development session, recording first development actions that occur in a development environment when developing code and storing the recorded first development actions in a stored representation of the first development session. The example also includes, during a second development session, retrieving the stored representation of the first development session and replaying the recorded first development actions in the development environment to reproduce the code. The example also includes, during the second development session, pausing replay of the recorded first development actions responsive to a pause request and causing modified code having modifications to be stored separately from the reproduced code responsive to current development actions that cause the modifications to the reproduced code.

Another example is a system that includes a hardware processing unit and hardware storage storing instructions. When the instructions are executed by the hardware processing unit, the instructions can cause the hardware processing unit to retrieve a stored representation of a previous development session that identifies recorded development actions and recorded audio data from the previous development session. The instructions can also cause the hardware processing unit to replay the recorded development actions and the recorded audio data in the development environment during a current development session. The instructions can also cause the hardware processing unit to, based at least on receiving a pause request during the current development session, pause replay of the recorded development actions and the recorded audio data and store a playback point indicating where replay of the previous development session is paused.

Another example is a system that includes a hardware processing unit and a development environment plug-in configured to be loaded by a development environment that provides application programming interfaces to the development environment plug-in. When loaded into the development environment, the development environment plug-in is further configured to execute on the hardware processing unit, retrieve a recorded representation of a previous development session that identifies recorded development actions from the previous development session, and cause the previous development session to be replayed in the development environment by calling the application programming interfaces provided by the development environment.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIG. 3 illustrates an exemplary representation of a development session, consistent with some implementations of the present concepts.

FIGS. 4-11 and 13-17 illustrate example graphical user interfaces of a development environment, consistent with some implementations of the present concepts.

DETAILED DESCRIPTION

Overview

Figure 1:
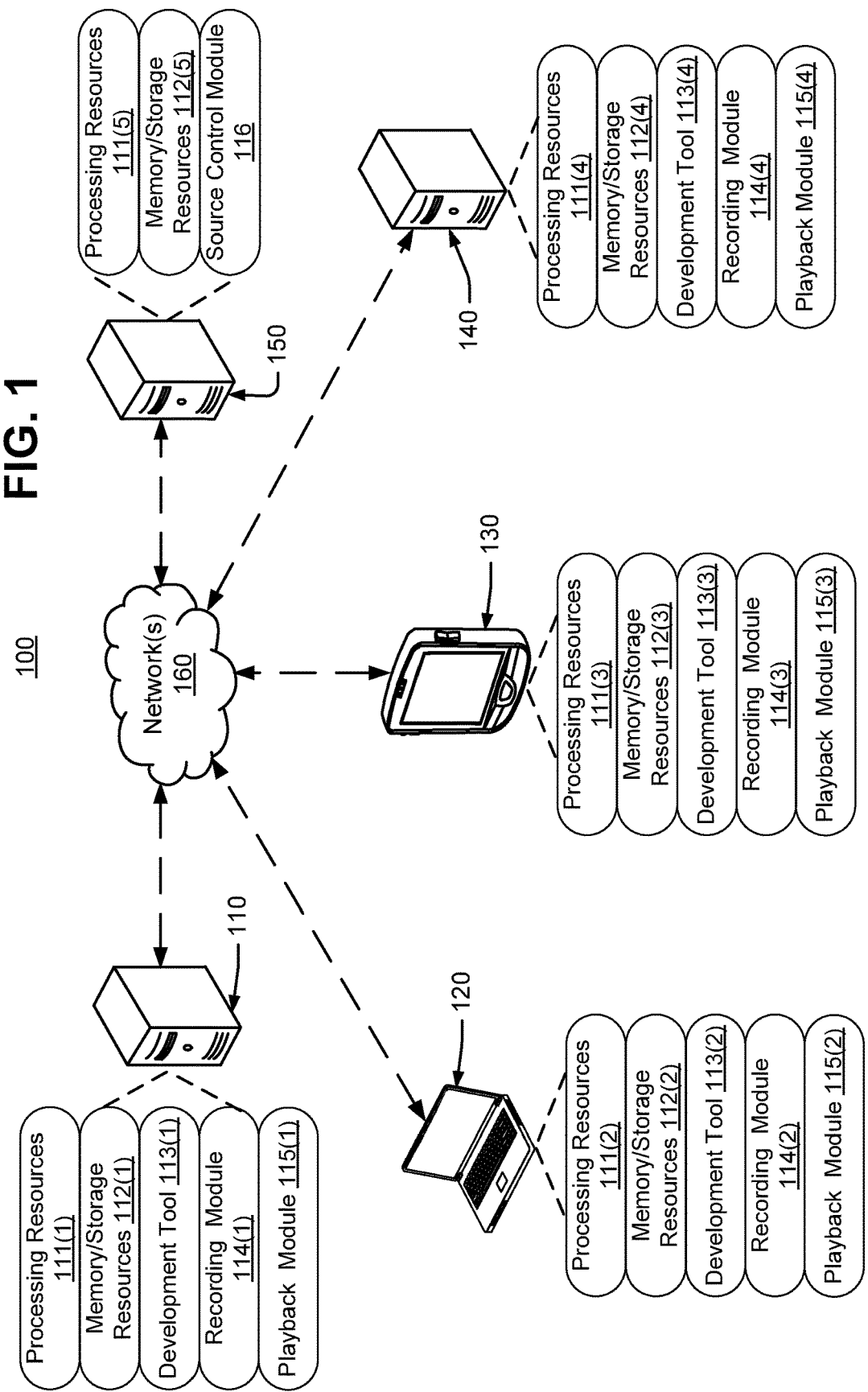
FIG. 1 illustrates an example environment, consistent with some implementations of the present concepts.

Under some circumstances, it can be useful to reproduce a session by a user in a development tool. For example, consider actions that occur when a tutor creates a coding tutorial, such as editing and compiling code in an integrated development environment. One approach might be to use a video camera to document the development session and then replay the video to students. Students could then learn how to write code and/or otherwise use the integrated development environment by watching the video.

However, this approach may have some drawbacks. For example, students may need to continually switch between the video tutorial and the integrated development environment on their screen. In addition, the student may need to duplicate the tutor's actions in order to get the integrated development environment to respond properly, e.g., a mistyped comma where the tutor typed a semicolon can be sufficient to cause a compilation error that confuses the student. Moreover, stored video representations are often very large data structures, particularly for long and/or high resolution videos.

In the disclosed implementations, development actions during a first development session are recorded and replayed at a later time during a second development session. For example, the development actions can include code edits (e.g., keystrokes) as well as development environment commands such as compile, link, run, etc., that were entered by a first user when the development session was recorded. Thus, when the development actions are replayed during the second development session, a second user can observe as the development environment applies the same development actions that were originally taken during the first development session. In some cases, the development actions are replayed along with language data that is associated with the first development session, such as recorded audio or written instructions for using the development environment. During the second development session, the user can make changes to code replayed from the first development session and then return to a previous version of the code by continuing with replay of the first development session.

Note that the following examples utilize a tutorial as an example of a development session, where the first user creates the tutorial and the second user views the tutorial. However, development sessions can be recorded for various reasons and need not be in the form of tutorials. For example, a development session could be replayed by developer's supervisor to review the developer's work quality. As another example, a development session could be replayed by the same user on different computers to diagnose errors in the code, e.g., to see if the problem only happens on a specific computer.

In addition, while the examples shown herein show users making edits to develop source code, the disclosed techniques can be employed in other contexts. For example, the disclosed techniques can be used to replay debugging sessions that do not necessarily involve editing code. The disclosed implementations can also be used with development tools other than development environments, e.g., by replaying interactions with source control and versioning mechanisms, code quality and analysis tools, etc.

Thus, for the purposes of this document, the term "development tool" encompasses various tools used for software design, development, testing, analysis, and quality control. For example, this term encompasses compilers, linkers, interpreters, versioning systems such as Git or CVS (Concurrent Versions System), static or dynamic code analysis tools, automated or manual testing tools, etc. The term "development environment" encompasses any development tool that provides code editing functionality with compiling, linking, and/or interpreting functionality. Note that some development environments may have other development tools (e.g., source control, automated testing, etc.) tools incorporated therein.

In addition, the term "development session" as used herein refers to a session where a user interacts with a development tool. For example, a development session with a development environment might include editing source code, compiling the source code into executable code, and running the executable code. A development session with a versioning tool might include identifying a file to be checked in, merging changes of the file with an older version, and checking in the merged version into the versioning repository. More generally, development sessions for other types of development tools generally involve user interaction with the development tools for some associated purpose.

The term "development action" encompasses various actions taken by a user during a development session. For example, in a development environment, the development actions can include code edits (e.g., text input via keyboard, voice, touch or non-touch gestures, etc.) as well as compile, link, run, and/or debug commands. In a code analysis tool, the development actions can include evaluating the call graph of a function defined in source code, identifying instances of a particular data type defined in the source code, etc. More generally, development actions in a given development tool typically involve various user inputs that cause the development tool to take associated steps such as analysis, testing, etc.

Cloud Scenario

The disclosed implementations can be performed in various scenarios, including locally on a single computing device as well as in networked or cloud scenarios. FIG. 1 shows an example environment 100 including various computing systems including a first session recording system 110, a second session recording system 120, a first session playback system 130, a second session playback system 140, and a source control system 150 connected by a network 160. Note that the names of the computing systems 110-150 are for convenience and merely refer to logical roles performed by these computing systems in the examples discussed herein.

As an overview of the following discussion, the examples presented herein will include a development session, in this case, a tutorial, developed on first session recording system 110 and/or second session recording system 120. The development session can be played back by first session playback system 130 and/or second session playback system 140. The recorded session as well as other code developed during playback of the recorded session can be stored on source control computing system 150.

Certain components of the computing systems 110-150 may be referred to herein by parenthetical reference numbers. For the purposes of the following description, parenthetical references identify an occurrence of a given component on first session recording system 110, (2) indicates an occurrence of a given component on second session recording system 120, (3) indicates an occurrence on first session playback system 130, (4) indicates an occurrence on second session playback system 140, and (5) indicates an occurrence on source control system 150. Unless identifying a specific instance of a given component, this document will refer generally to the components of the computing systems without the parenthetical.

Generally, each of the computing systems 110-150 may have respective processing resources 111 and memory/storage resources 112, which are discussed in more detail below. The various computing systems may also have various modules that function using the processing and memory/storage resources to perform the techniques discussed herein, as discussed more below.

The session recording systems 110 and 120 and the session playback systems 130 and 140 can have corresponding instances of a development tool 113, recording module 114 and a playback module 115. Generally, the development tool can be used to conduct various development sessions. The recording module can be used to record the development sessions and the playback module can be used to play back the sessions. Thus, although not shown in FIG. 1, the session recording systems 110 and/or 120 may lack the playback module in some implementations, and the session playback systems 130 and/or 140 may lack the recording module in some implementations.

The source control system 150 may have a source control module 116. The source control module 116 may be configured to receive and store recorded representations of development sessions, source code, executable code, etc. Generally, the source control module can provide versioning functionality and allow different users to check out different development sessions and code for updates and then check in revised versions of the development sessions and/or code.

Example Recording Method

The following discussion presents an overview of functionality that can record a representation of a development session, e.g., as performed by recording module 114. Note that this functionality can be performed by many different systems or modules, e.g., a cloud service, a local application, a development tool or development tool plug-in, a library routine, an operating system routine, and/or dedicated hardware circuitry, depending upon the specific implementation.

Thus, the functionality can be implemented in software, hardware, or combinations thereof.

Figure 2:
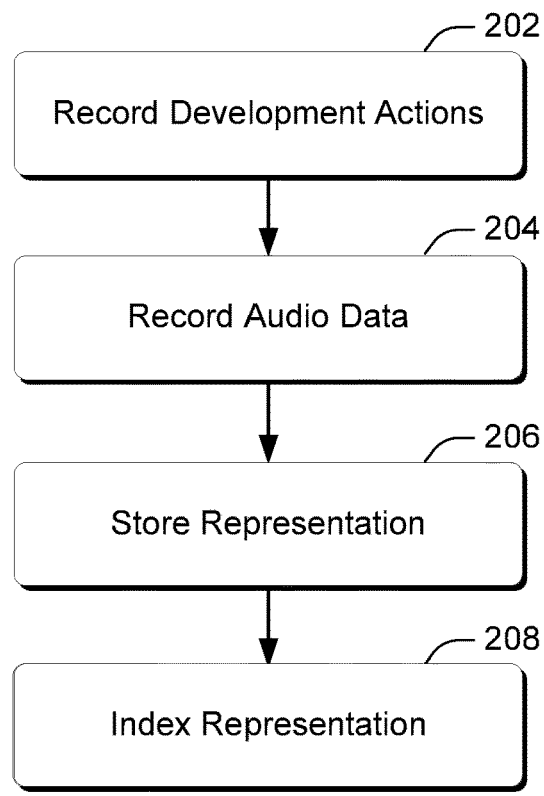
FIGS. 2 and 12 illustrate example methods or techniques, consistent with some implementations of the present concepts.

FIG. 2 illustrates an exemplary method 200 consistent with the present concepts. This method can be implemented on many different types of devices, e.g., by one or more cloud servers, by a client device such as a laptop, tablet, or smartphone, or combinations thereof. Method 200 can be implemented by recording module 114 executing locally on the same device as a development tool conducting the development session or on a different device.

Method 200 begins at block 202, where development actions are recorded. For example, the development actions can include development tool commands such as commands to compile, link, debug, run, analyze, and/or test code. In some cases, the development actions can include edits to the code such as variable definitions, operators, function calls, etc.

Method 200 continues at block 204, where audio data is recorded. For example, the audio data can include words spoken while the development actions occur during the development session. In some cases, the audio data can include a spoken description of the development actions.

Method 200 continues at block 206, where a representation of the session is stored. For example, the representation can include the recorded development actions as well as the recorded audio data. In some cases, the stored representation is chronologically arranged. For example, the stored representation can arrange portions of the audio data so that they are aligned with corresponding development actions. Thus, the stored representation can be iterated over to replay a particular development action with audio data that was recorded contemporaneously with that development action, as discussed more below.

Method 200 continues at block 208, where the recorded session representation is indexed. For example, the session representation can be indexed by various programming items so that particular programming items are linked to associated portions of the audio data. For the purposes of this document, the term "programming item" encompasses many different items that can appear in source code. For example, a programming item could be a function or variable defined in the source code, a class used in the source code, a namespace defined or used in the source code, etc. In addition, a programming item could be a source code file, an object file, a library file, a project file, a test case, etc. As discussed more below, indexing programming items allows users to select an individual programming item and then begin replaying the recorded representation from the time when that programming item was introduced during the session and/or discussed in the audio data.

Example Session Recording

The following discussion introduces an example "Hello World" program and illustrates further details of how the recording module 114 can perform method 200. FIG. 3 shows an example session representation 300 that can be generated and stored by the recording module for an example development session. FIGS. 4-11 generally show how the "Hello World" program can progress over time as a user enters various inputs into a development environment during the recorded development session.

As shown in FIG. 3, the session representation 300 can include a time column 302, an audio data column 304, a development actions column 306, and an index column 308. Generally, the time column can indicate when corresponding audio data in column 304 was recorded. The time column can also indicate when the user performed various corresponding development actions in column 306. The index column 308 can show certain programming items that are indexed in the session representation for subsequent retrieval, as discussed more below.

Figure 4:
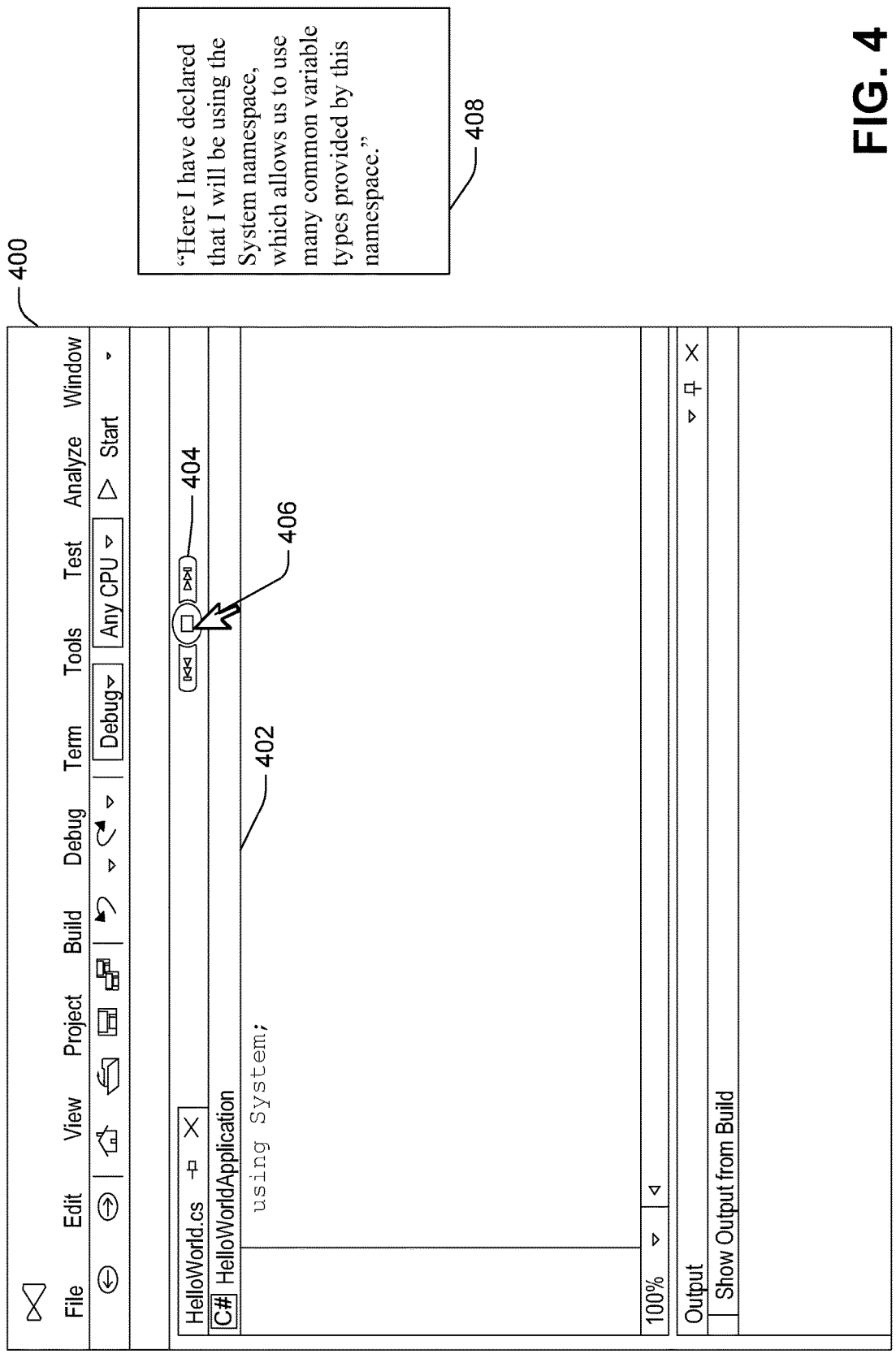

FIG. 4 shows a development environment interface 400 with a code editor 402 that can be used to enter code for processing by the development environment. The development environment interface includes a session recording control 404 that can be selected by the user using a cursor 406 to start recording of the development session. This, in turn, can cause the recording module 114 to begin recording the session representation 300 shown in FIG. 3. The development environment interface shows a HelloWorld.cs file that is part of a HelloWorld application being built by the user.

As shown in FIG. 4, the user has edited the source code to say "using System," which is a statement that tells the development environment to use the System namespace when compiling this code example. In addition, the user has provided spoken audio block 408 explaining the source code that has been entered to this point. Accordingly, audio block 408 and the text "using System," are recorded by the recording module in the first row of session representation 300, which corresponds to the first 30 seconds of the session. In addition, the recording module can index this portion of the representation by associating the System namespace with the first 30 seconds of the representation. This can allow a later user to select the System namespace and return to the portion of the session where the System namespace is discussed, as set forth in more detail below.

Figure 5:
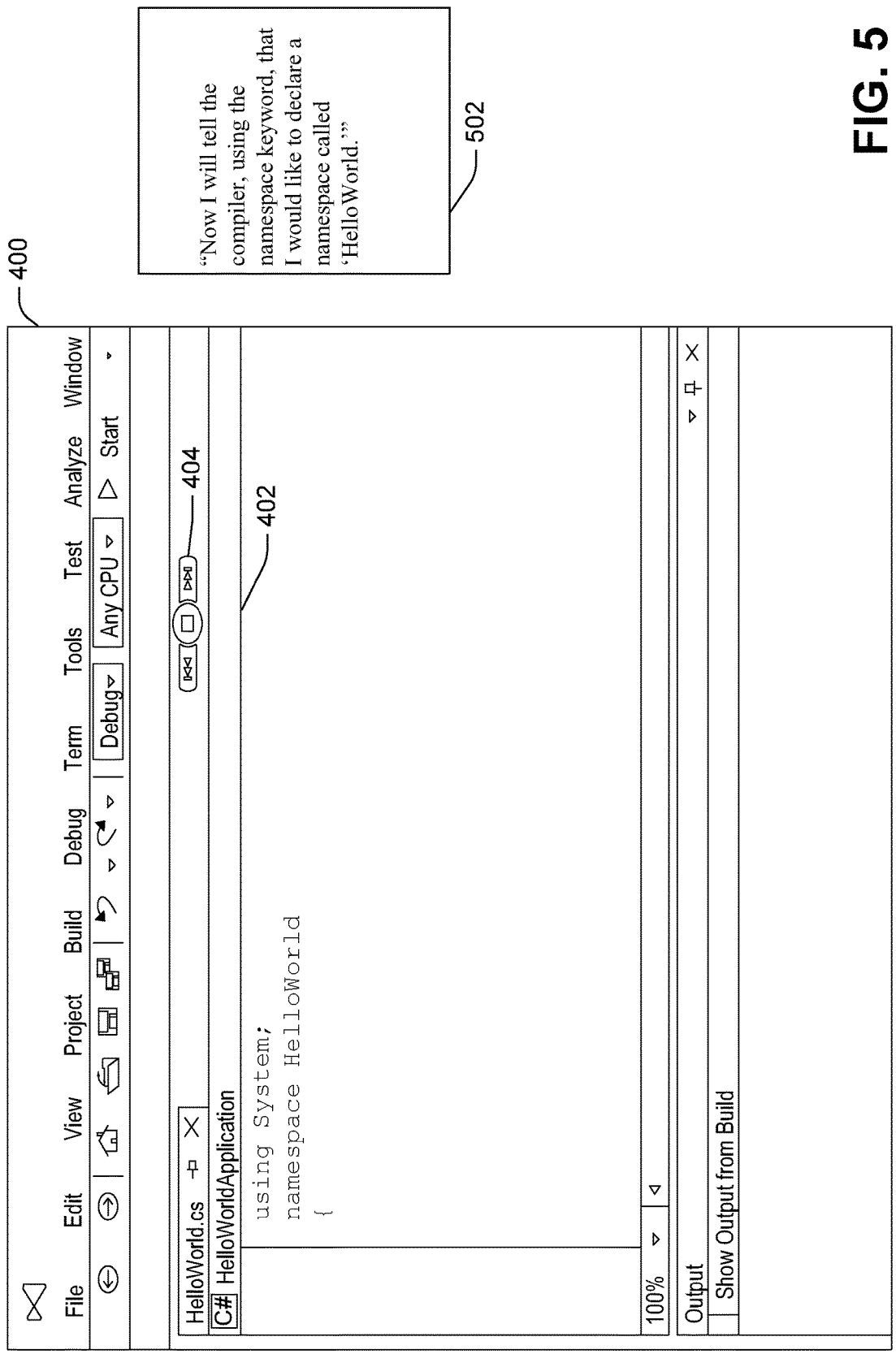

FIG. 5 continues with the previous example, where the code editor 402 has been updated to include another statement defining a namespace entitled "HelloWorld." In addition, the speaker has provided spoken audio block 502 explaining that this is what the statement "namespace HelloWorld" means. Again, this audio block and corresponding text are recorded by the recording module into the second row of session representation 300, which corresponds to the next 30 seconds (seconds 31-60) of the session. In addition, the recording module can index this portion of the representation by associating the HelloWorld namespace with the 31 second mark of the representation. This can allow a later user to select the HelloWorld namespace and return to this portion of the session without starting over at the beginning of the recorded session.

Figure 6:
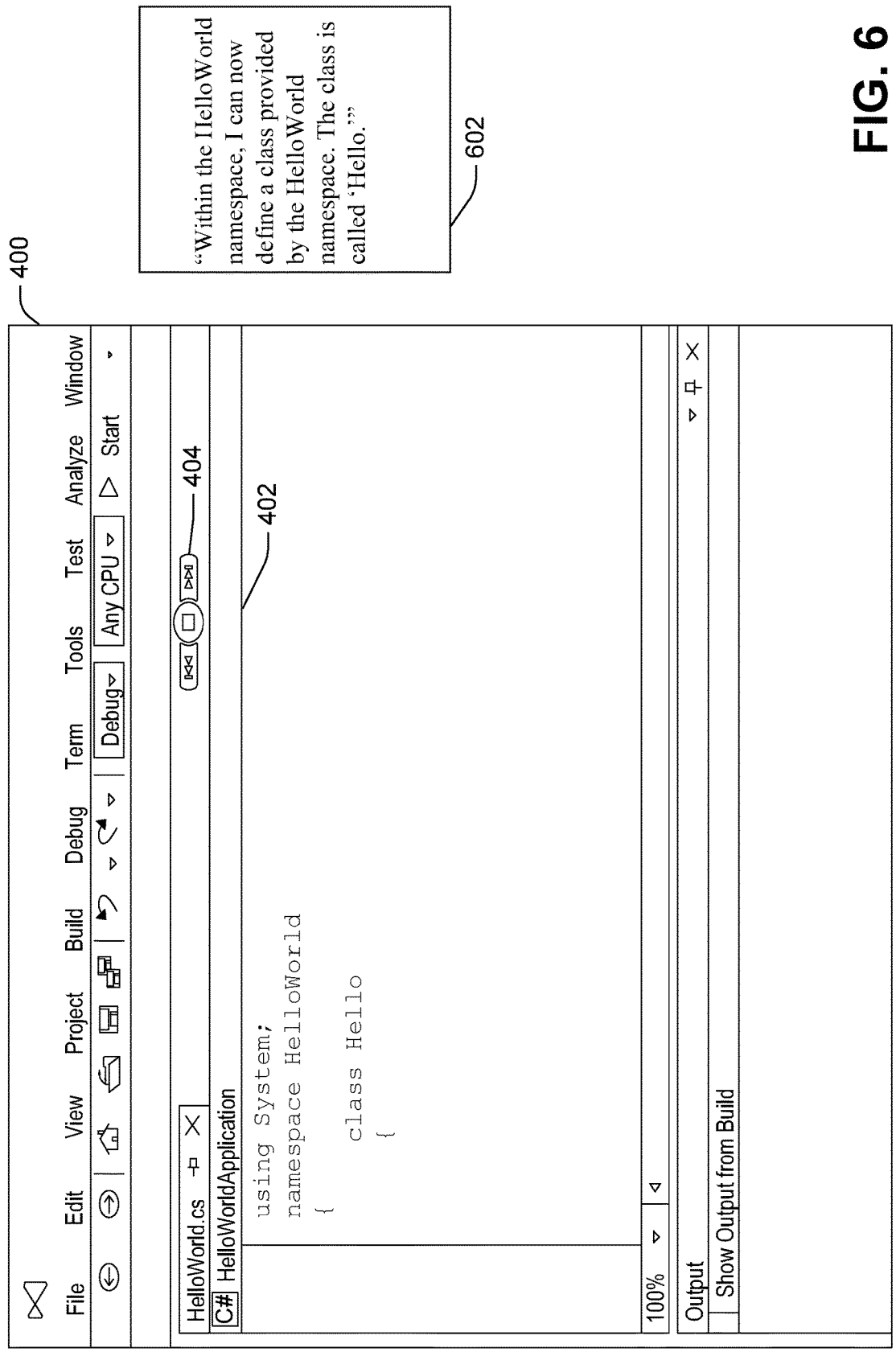

FIG. 6 continues with the previous example, where the code editor 402 has been updated to include another statement that introduces a class entitled "Hello." In addition, the speaker has provided spoken audio block 602 explaining that this is what the statement "class Hello" means. Again, this audio block and corresponding text are recorded by the recording module into the third row of session representation 300, which corresponds to the next 30 seconds (seconds 61-90) of the session. In addition, the recording module can index this portion of the representation by associating the Hello class with this audio block and text.

Figure 7:
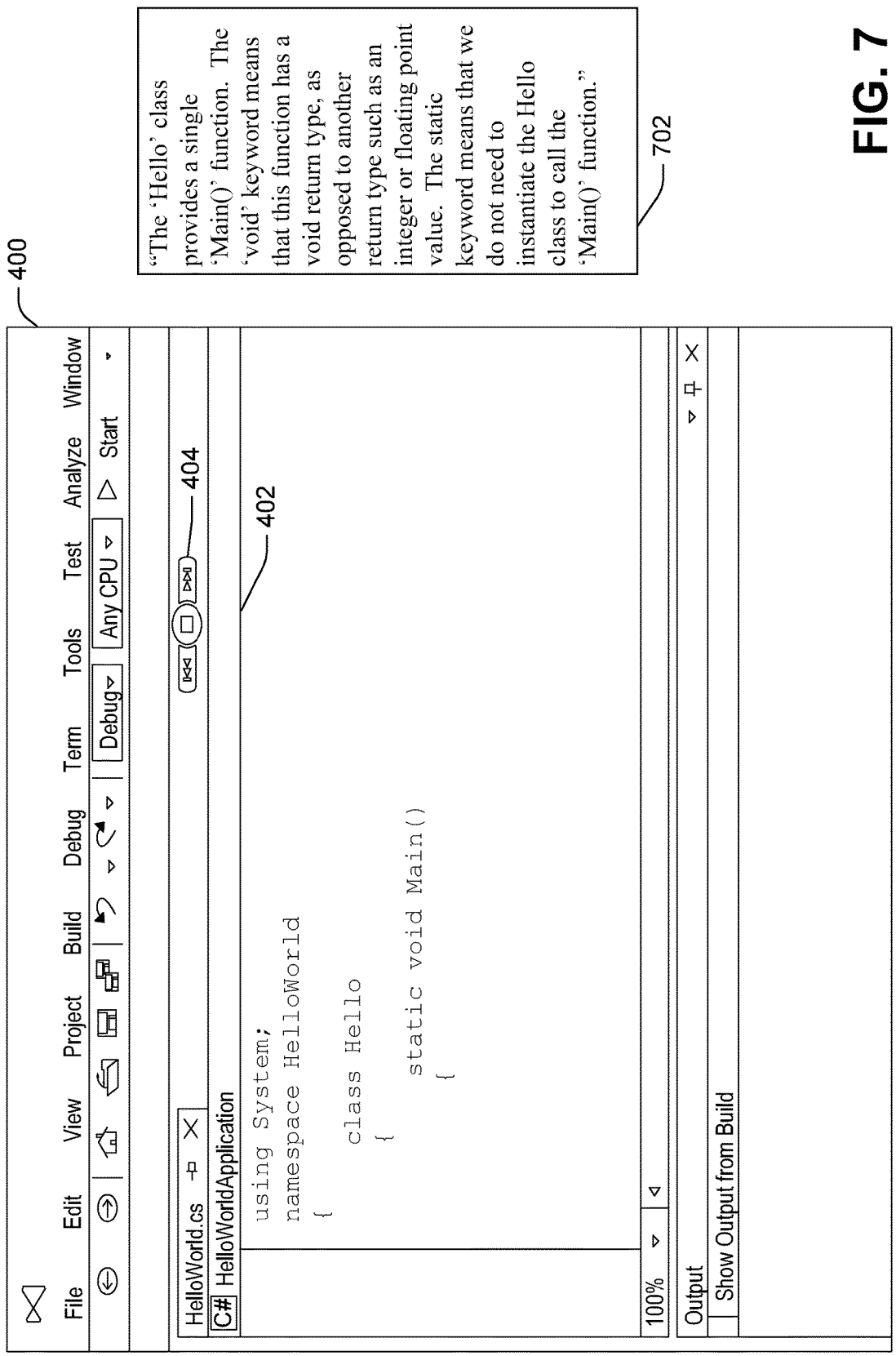

FIG. 7 continues with the previous example, where the code editor 402 has been updated to include another statement that introduces a function called "Main( )" that is declared with the "static" and "void" keywords. In addition, the speaker has provided spoken audio block 702 which explains the significance of this code. Again, the audio and corresponding text are recorded by the recording module into the fourth row of session representation 300, which corresponds to the next 30 seconds (seconds 91-120) of the session. In addition, the recording module can index this portion of the representation by associating the Hello class with this audio block and text.

Figure 8:
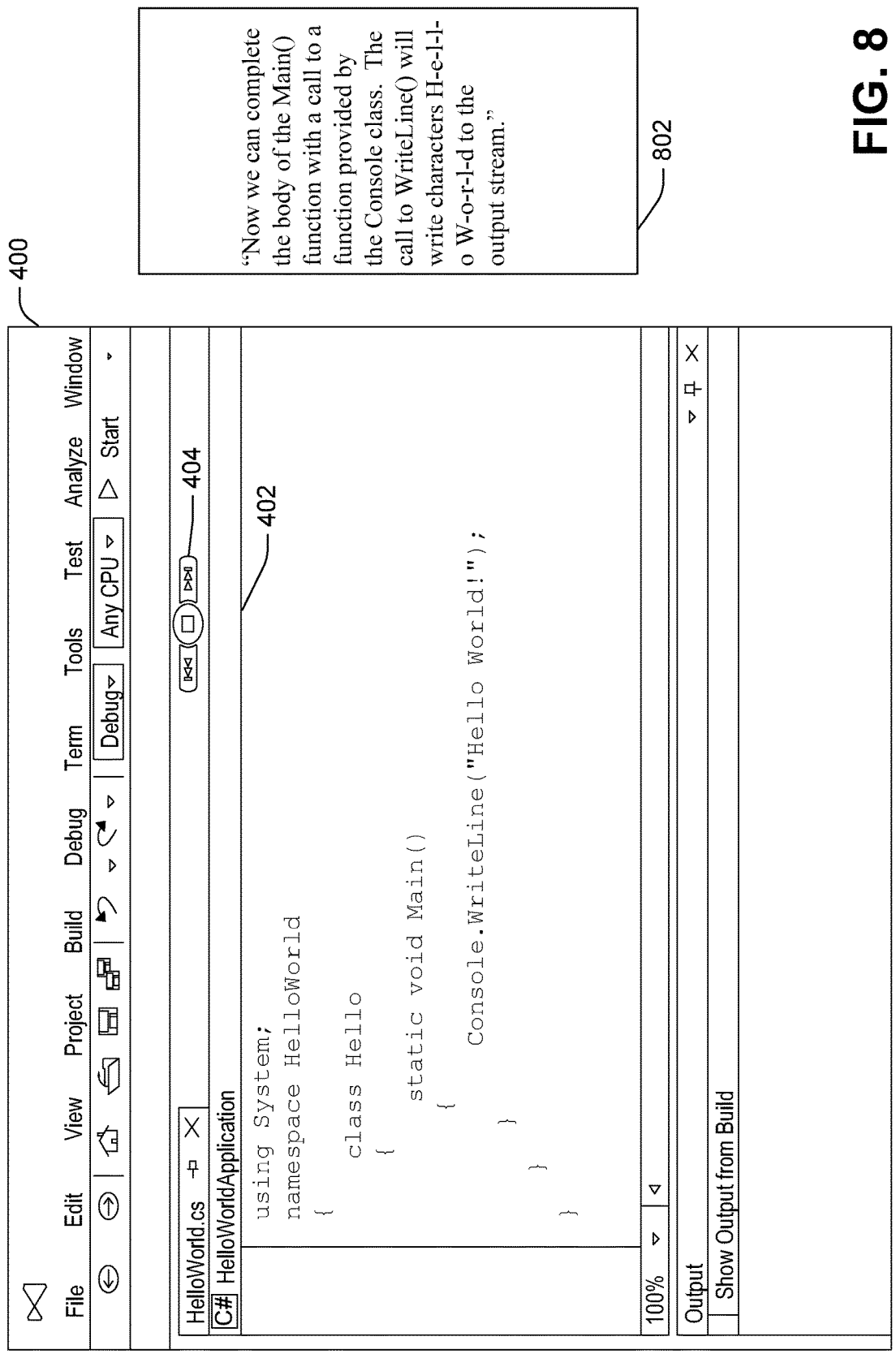

FIG. 8 continues with the previous example, where the code editor 402 has been updated to include a statement that calls a function provided by the Console class. Again, the speaker has provided audio block 802 that explains the significance of the input code, and again the recording module can update and index the representation 300 accordingly for seconds 121-150.

Figure 9:
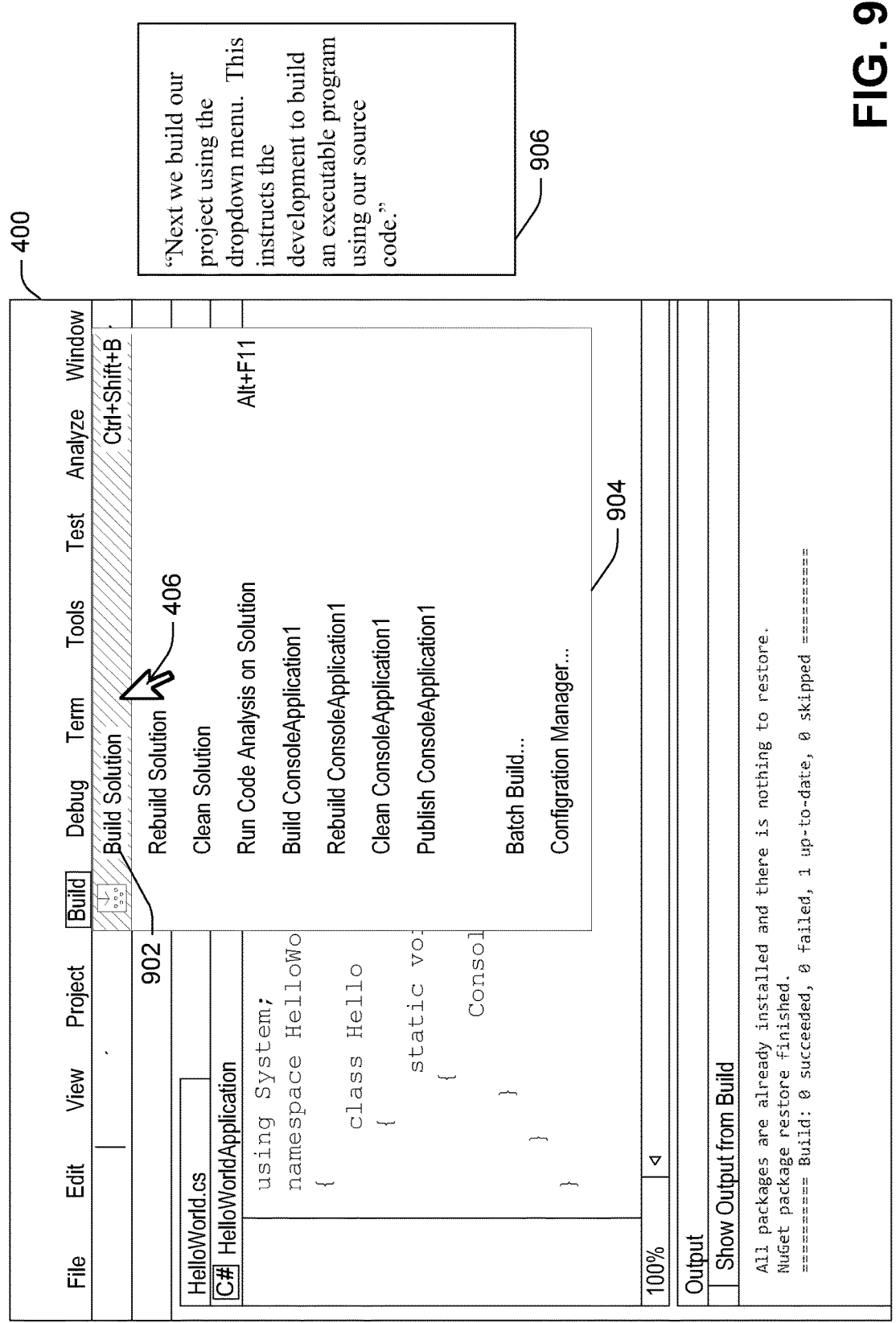

FIG. 9 continues with the previous example. However, instead of adding new code to the code editor 402, the user has entered a Build command to the development environment. FIG. 9 illustrates this via cursor 406 selecting the Build command 902 from a dropdown menu 904. Here, the speaker has provided spoken audio block 906 that explains the dropdown menu and the Build command. The recording module can update the representation 300 once again to include the audio and Build command for seconds 151-180. Note, however, that in this case the recording module does not index this portion of the session. In some implementations, however, development environment commands can also be indexed.

Figure 10:
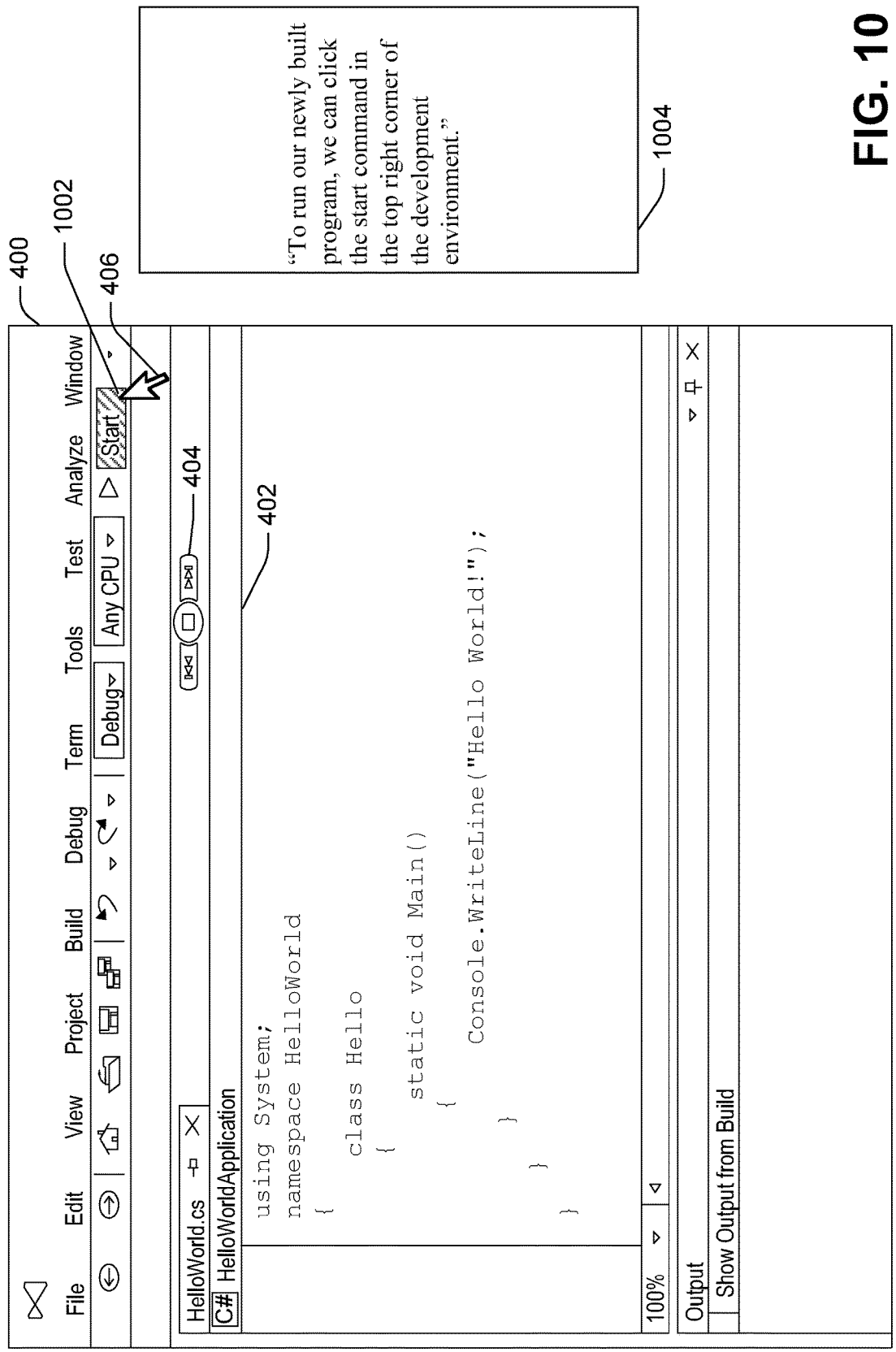

FIG. 10 continues with the previous example. Here, the user has entered a Start command to the development environment. FIG. 10 illustrates this with cursor 406 selecting Start command 1002 from the development environment interface 400. The recording module can update the representation 300 once again to include audio block 1004 and the Start command for seconds 181-210.

Figure 11:
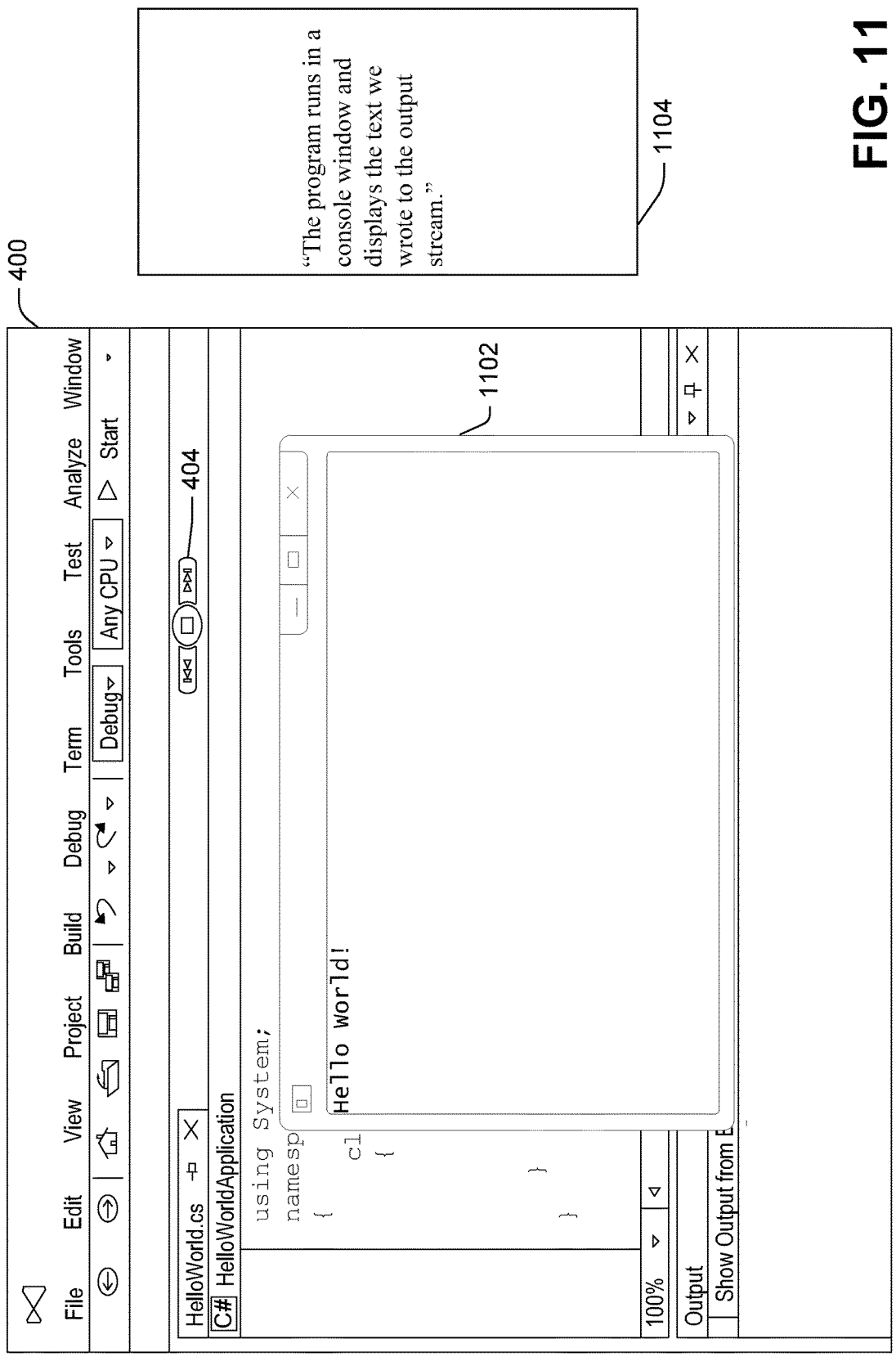

FIG. 11 continues with the previous example and shows an output console 1102 displayed over the development environment. Note that this is displayed automatically responsive to selection of the Start command, so no corresponding entries are included in column 306. This is because performing the previous actions from column 306 will cause the development environment to generate the output console. However, audio block 1104 is added to the session representation so that the explanation of the console window can be played back at a later time.

Indexing

As discussed above, some implementations can index the recorded session representation by various programming items, such as functions, variables, namespaces, etc. This can be performed in several different ways. In some cases, the user recording the session may provide further inputs associating blocks of audio data with individual programming items. For example, the user might select the "System" namespace and record audio block 408 in association with this programming item, then select the "HelloWorld" namespace and record audio block 502 in association with this programming item, and so on. In other words, explicit user inputs identify which audio blocks are associated with specific programming items.

In further implementations, the recording module 114 may automatically determine which audio blocks are associated with which programming items. For example, the recording module can use voice recognition to correlate the spoken audio to particular classes, functions, etc. Further implementations may involve the user to some degree, e.g., the user may provide a specific voice cue specifying which programming item is being explained, e.g., by speaking "Start recording Main( ) function audio now" or some other indication of the specific programming item that will be explained.

Example Playback Method

The following discussion presents an overview of functionality that can play back recorded development actions and/or associated audio from a stored session representation, e.g., as performed by the playback module 115. The functionality can be performed by many different systems or modules, e.g., a cloud service, a local application, a development tool or development tool plug-in, a library routine, an operating system routine, and/or dedicated hardware circuitry, depending upon the specific implementation. Thus, the functionality can be implemented in software, hardware, or combinations thereof.

Figure 12:
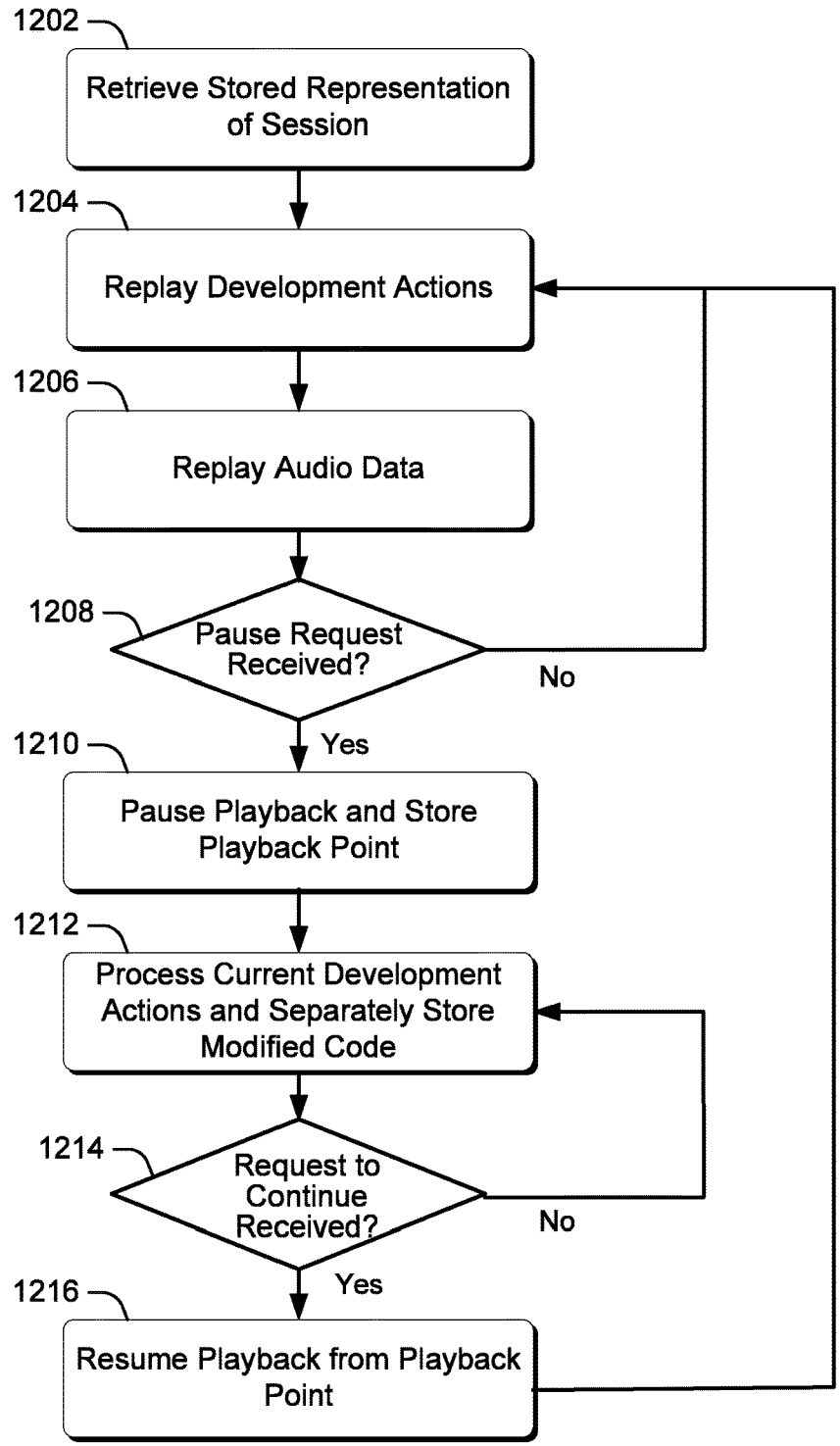

FIG. 12 illustrates an exemplary method 1200 consistent with the present concepts. As discussed more below, the method can be implemented on many different types of devices, e.g., by one or more cloud servers, by a client device such as a laptop, tablet, or smartphone, or combinations thereof. Method 1200 can be implemented by playback module 115 executing locally on the same device as a development tool in which the session is replayed, or on a different device.

Method 1200 begins at block 1202, where a stored session representation of a first (e.g., previous) development session is retrieved during a second (e.g., current) development session. For example, a user may provide an input selecting a particular recorded session and, in response, the playback module may open a recorded representation of the selected session.

Method 1200 continues at block 1204, where recorded development actions in the session representation are replayed in the development tool. For example, the playback module may enter text into a code editor in a development environment, issue commands such as build, compile, or execute to the development environment, issue commands to a testing tool to execute test cases in, issue commands to an analysis tool to analyze code, etc.

Method 1200 continues at block 1206, where audio data is replayed concurrently with the development actions. For example, the playback module can retrieve specific blocks of audio data from the session representation and replay these audio blocks while replaying associated development actions. In some cases, the playback module iterates chronologically through the stored session representation, replaying the recorded audio and recorded development actions in the order that they were initially recorded by the recording module 114.

Method 1200 continues at decision block 1208, where a determination is made as to whether a pause request has been received. For example, the user may provide an explicit pause input using a pause control requesting to stop the session. Alternatively, the user may make changes to the code and this can be interpreted by the playback module as a pause request. In either case, the playback module can pause playing back the previous session.

If no pause input is received, the method returns to blocks 1204 and 1206, where the development actions and associated audio continue to be replayed in the development environment.

If a pause request is received, the method continues to block 1210, where a playback point is stored indicating where replay has been paused. For example, the playback point can identify a time (e.g., in seconds) where the replayed audio and development inputs were stopped. In addition, the current state of any source code reproduced by replaying the development actions can be persisted (e.g., stored in permanent storage).

Next, method 1200 continues to block 1212, where current development actions in the current development session are processed. Current development actions can be handled separately from the recorded session. For example, the user may make changes to the reproduced source code file that was generated by playback of the recorded session. The user can also take other development actions such as compiling and running the modified source code file. The playback module may store the modified source code in a separate file from the reproduced source code and/or store the modifications in a memory buffer.

Next, method 1200 continues to block 1214, where a determination is made as to whether a request to continue with playback of the previous session has been received. If not, the method continues processing further current development actions while playback remains paused.

On the other hand, if a request to continue has been received, the method continues to block 1216, where playback of the recorded session is resumed. For example, playback can be resumed by retrieving the playback point stored at block 1210 and restoring the reproduced source code in the current development session. Thus, the playback module can continue with replaying of the recorded development actions and then recorded from the playback point.

Example Session Playback

The following discussion illustrates playback of the "Hello World" session and illustrates further details of how the playback module 115 can perform method 1200.

Figure 13:
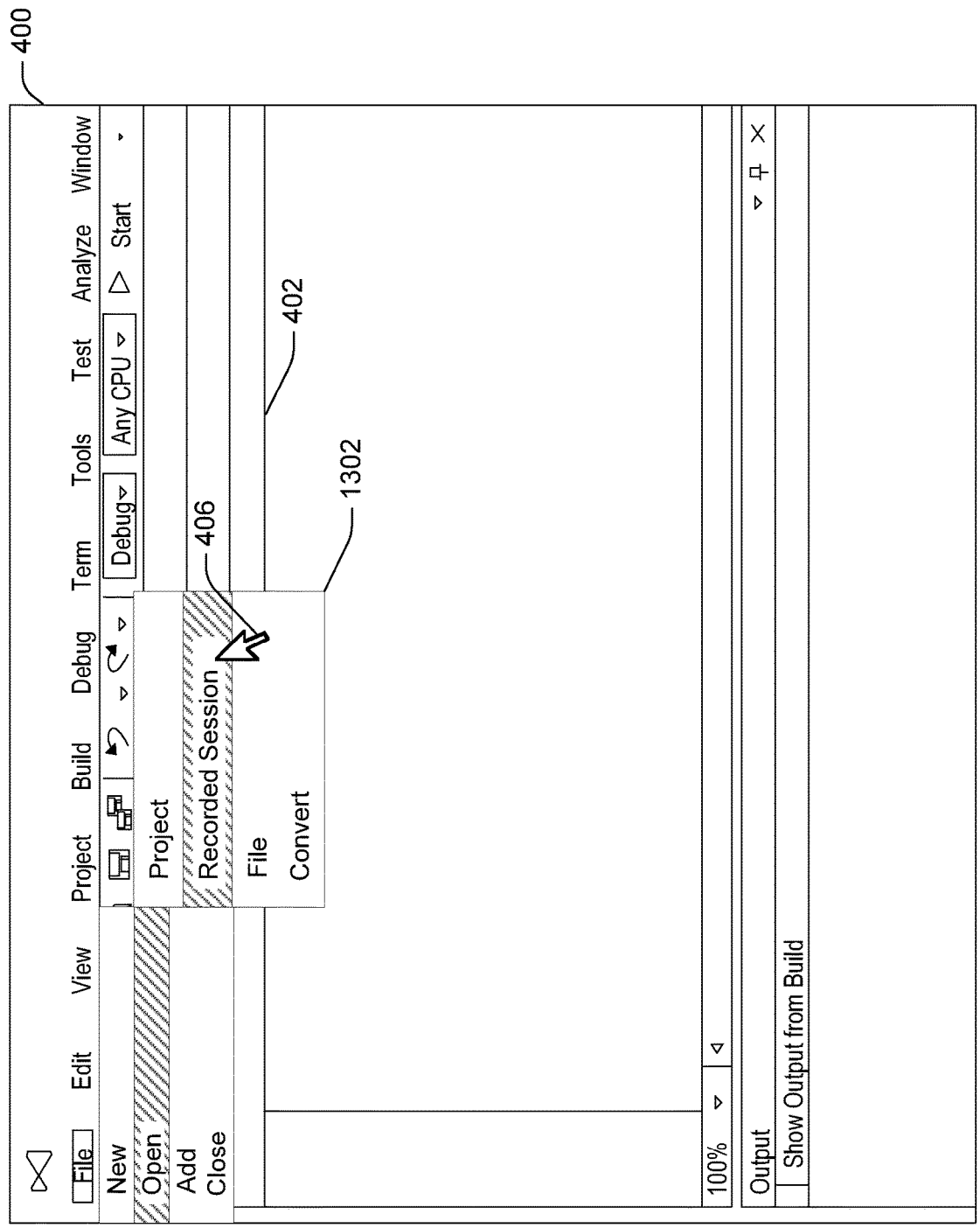

FIG. 13 shows the development environment interface 400 in a state at the beginning of a current development session where no projects or files are loaded in the development environment. At this time, the user can select a dropdown menu 1302 to open a previously-recorded session with cursor 406. This can trigger the playback module 115 to perform block 1202 of method 1200, e.g., retrieving the stored representation of a previous development session.

Figure 14:
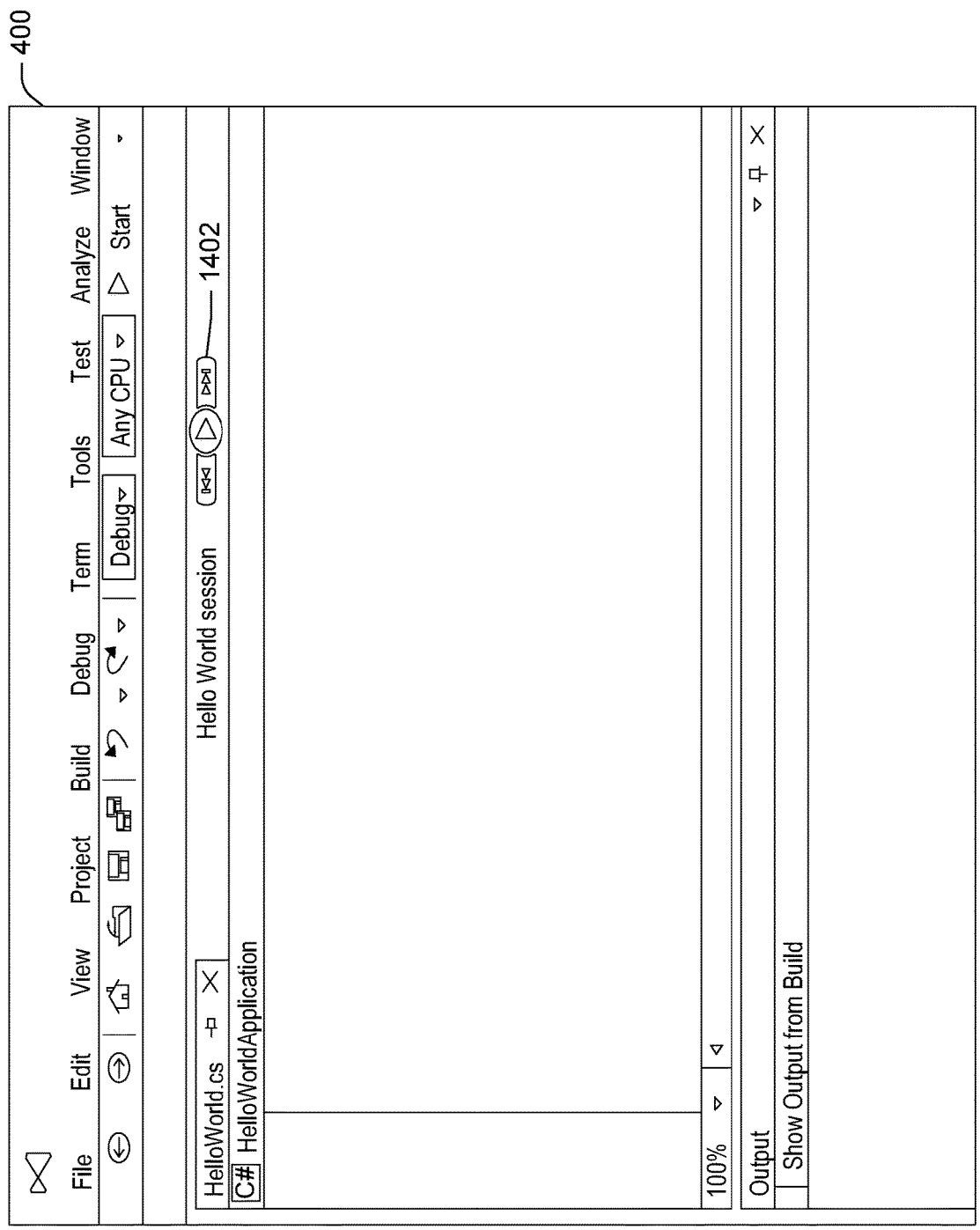

After opening the recorded session representation, the playback module 115 can populate the development environment interface 400 with projects and/or source files from the recorded session. This is shown in FIG. 14, where the HelloWorld.cs file and HelloWorld application are now open in the development environment. At this time, no source code has been entered or compiled in the current session. Rather, the source code will be edited and compiled by replaying the recorded development actions, as discussed more below.

FIG. 14 also shows a session playback control 1402 that can be selected by the user to start playback of the recorded session. This, in turn, can cause the playback module 115 to begin iterating through the recorded representation and playing back the recorded session. For example, referring back to FIG. 3, the playback module can begin playing back seconds 0-30 of the recorded session 300 by entering text into the HelloWorld.cs file and playing back associated audio block 408. As shown in FIGS. 3 and 4, this audio block includes the user speaking "Here I have declared . . . " and the text includes the "using System" code entered by the user. Thus, the development environment can appear in the current session similar to its appearance at this point in the recorded session, as shown in FIG. 4.

Next, the playback module 115 can continue by playing back seconds 31-60 of the recorded session and performing the recorded development actions. In this case, the playback module causes the text "namespace HelloWorld" to be entered into the development environment and plays back associated audio block 502, as shown in FIG. 5. If the user does not pause the replay of the previous session, the previous session can continue to iterate through the recorded session by replaying the development actions and corresponding audio blocks. In this case, the development environment interface 400 will appear as shown in FIGS. 6-11 with the corresponding audio blocks played back in progression, culminating with displaying the console window 1102 and playing back audio block 1104.

Suppose, however, that the user plays back the recorded session through the first 120 seconds and then decides to edit the code themselves. FIG. 7 shows the development environment interface 400 during seconds 90-120 of playback, at the point where the user decides to edit the code themselves. Thus, at this point, the playback module pauses playback of the recorded session (e.g., block 1208 of method 1200) and stores a playback point (e.g., block 1210 of method 1200) indicating that the user paused playback at 120 seconds. In addition, the playback module can record the current state of the source code (the HelloWorld.cs file) and any associated project files.

Next, the playback module 115 and/or development environment itself can process current development actions that are not part of the recorded session. FIG. 15 shows a scenario where the user has entered their own edits to the code. The user can continue to edit the code in the editor as well as building, running, and debugging the code. Any changes to the source code file HelloWorld.cs are stored separately from the reproduced source code.

At some point, the user may choose to continue with playback of the recorded session. For example, the user might select session playback control 1402 to do so. At this point, the playback module 115 can shelve the user's version of the HelloWorld.cs program, e.g., by submitting the user's version to the source control system 150 or persisting any changes to a separate file. The playback module can then retrieve the recorded state of the source code at the time that playback was stopped, and can also retrieve the recorded playback point. Then, the playback module can continue playback from the restore point. Since, in this example, the user started entering their own code when the development environment interface 400 was in the state shown in FIG. 7, the development environment interface will roll back to this state and then continue progressing through to the state shown in FIG. 13, assuming no further pause inputs are received.

Figure 16:
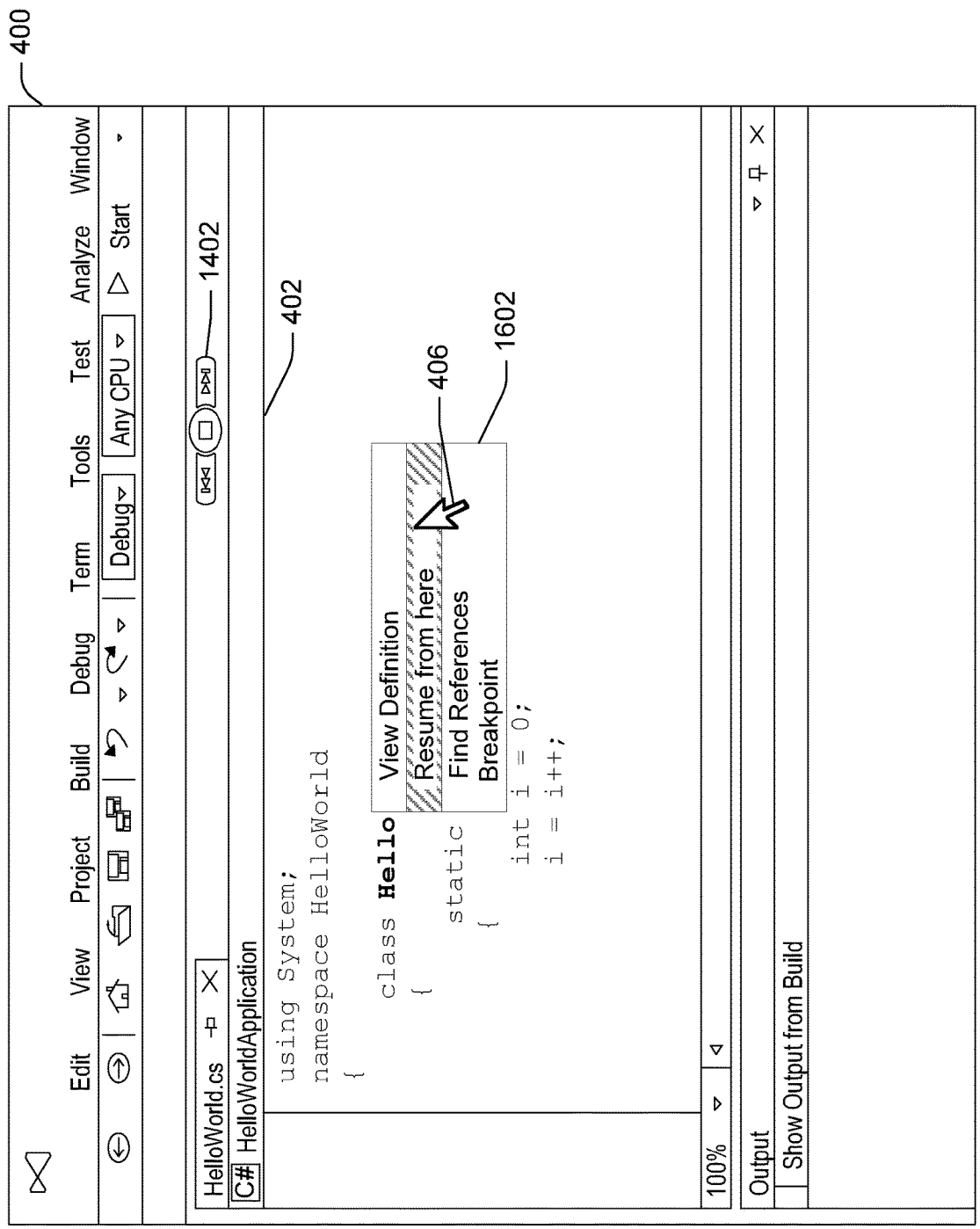

Note that the playback module 115 can also revisit playback to any programming item that is indexed in the stored representation. For example, FIG. 16 shows a scenario where the user has selected the "Hello" class and selected an option to resume playback from the Hello class from a menu 1602. Responsive to this input, the playback module can identify the Hello class in the representation. As can be seen in FIG. 3, the Hello class is indexed to seconds 61-90 of the recorded session. Thus, the playback module can begin replaying the previous session at 61 seconds. This allows the current user to go back and listen again to the audio to better understand the description of this class. Should the user instead select the Main( ) function, the playback can begin at 91 seconds, or at 121 seconds for the Console.Writeline( ) function, and so on.

Figure 17:
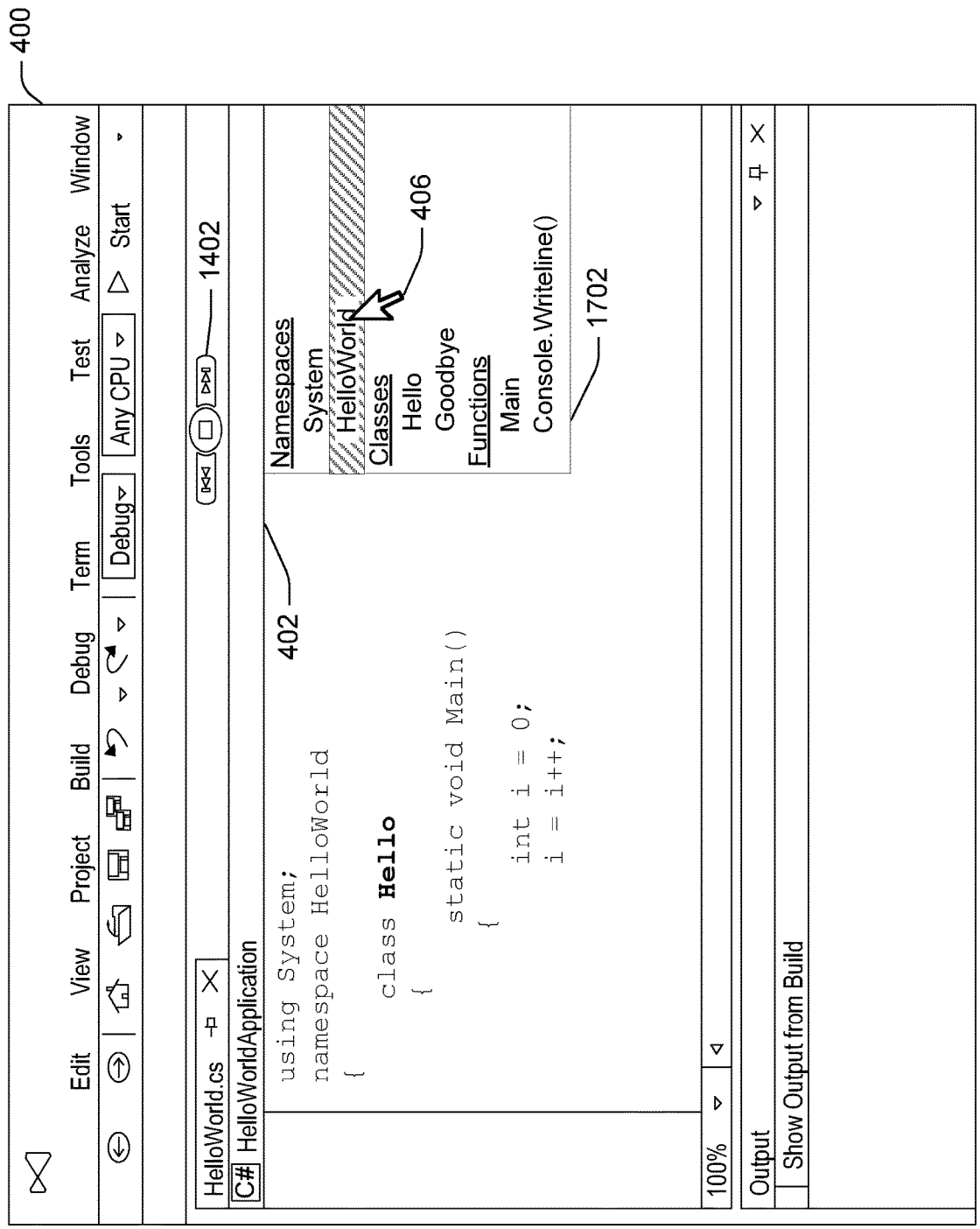

FIG. 17 illustrates an alternative implementation for revisiting playback of programming items. For example, FIG. 17 shows an index menu 1702 that can display various namespaces, classes, functions, or other programming items that are indexed for a given recorded session. Here, the user can select an individual programming item from the index menu to begin replaying the previous session from the corresponding point. In the example of FIG. 17, the user has selected the HelloWorld namespace, so playback can begin at 31 seconds as indicated in the index column 308 shown in FIG. 3.

Plug-In Implementations

As previously noted, the recording and playback functionality described herein can be performed on many different devices and by many different types of recording and playback modules. In some implementations, the recording and/or playback functionality is provided as an extension or "plug-in" to a development tool. Generally, some development tools provide a group of application programming interfaces ("APIs") that can be used by a plug-in to perform certain functionality. The development tools can load the plug-in into memory and the plug-in can then execute and call the APIs.

For example, a plug-in could perform recording functionality by registering with a development environment to receive text inputs and/or commands. In some cases, the plug-in causes recording control 404 (FIG. 4) to be displayed in the development environment. When the recording control is selected by a user, this causes the development environment to direct any text inputs or development commands to the plug-in to be recorded.

To perform playback functionality, the plug-in can retrieve a stored session representation and iterate through the session representation. While doing so, the plug-in can direct any text that is played back to a source file in the development environment while calling specific APIs to build, debug, and/or execute the code in the source file. The plug-in can cause session playback control 1402 and/or a pause control to be displayed in the development environment so that the user can control playback of the recorded session.

To handle scenarios where users modify source code restored by playback of a previous session, the plug-in can control which files have focus in the development environment. When playing back code, the plug-in can cause a first source code file to have focus so that the first source file receives any text output during playback and also so that any commands executed by the development environment are performed on the first source file. Thus, the restored code can be stored in the first source code file.

Once playback is paused, the plug-in can cause a second source code file to be created with the restored code, e.g., a copy of the first source code file. The plug-in can also cause the second source code file to have focus so that, while playback is paused, the second source file receives any text output and also so that any commands executed by the development environment are performed on the second source file. If playback is resumed, the plug-in can cause the first source file to have focus again for consistency with the recorded session. This mechanism allows the plug-in to handle dynamic user changes to the source code via the second source code file while still allowing the user to return to the previous state of the recorded session via the first source code file. In implementations where users manipulate other types of files (e.g., test cases), separate copies of those files can be maintained in an analogous manner to allow users to interact directly with the development tool and return to a previous state of a recorded session.

In some implementations, the plug-in can also perform dependency management functions. For example, a first instance of the plug-in on the first session recording system 110 can check in a session where a source code file has been developed. If that source code file (or other project file) has a dependency on a specific library (e.g., a statically or dynamically-linked library), the dependency can be handled in several different ways. In some cases, the first instance of the plug-in can check in the library along with the recorded session so that both can be retrieved by a second instance of the plug-in on first session playback system 130. In other cases, a second instance of the plug-in on the first session playback system can identify the dependency when playing back the recorded session and, if a local copy of the library is not available, obtain the library from a network resource. Note that other types of programming resources besides libraries can also be handled in a similar manner, e.g., standard development kits, etc.

Session Representations

Referring back to FIG. 3, session representation 300 shows but one of many different examples of how stored sessions can be represented. For example, FIG. 3 shows the audio track broken into 30 second blocks that are each associated with different development actions and programming items. In other cases, a single contiguous audio track is stored and individual development actions are stored in association with timestamps in the audio track. Each development action can be performed as the corresponding timestamps in the audio track are replayed. Likewise, programming items can be indexed to specific timestamps in the audio track.

In addition, some implementations may allow different users to contribute to a recorded session. For example, a first user at first session recording system 110 (FIG. 1) might demonstrate how to use a development to write and execute source code, and check in the recorded session to source control system 150. A second user at second session recording system 120 might check out the recorded session from the source control system and add a segment showing how to use a debugger to debug the source code provided by the first user, and then check in a modified version of the recorded session. The first user might decide to check the modified version back out to add some changes to the source code after the debugging lesson.

As another example, the first user might check in a recorded session where the first user has written source code for a particular class, including definitions of various class variables and member functions. A second user can then check out the session and write a child class that inherits the class variables as well as the functions from the parent class written by the first user. The second user can then check in an updated version of the session that includes both edits made by the first user to code the parent class and edits made by the second user to code the child class. This would allow another user to replay the updated session and see the development actions of both the first user and the second user. Thus, the user can observe how to code an initial class as well as how to use inheritance to extend class functionality.

In such implementations, the session representation 300 can include contributions from multiple previous sessions (e.g., two sessions by the first user and a single session by the second user). When the session representation is replayed, it can appear as a single contiguous session starting with the initial coding session by the first user, then the debugging session by the second user, and then the subsequent coding session by the first user. The session representation may indicate which users and/or systems provided certain portions of the representation.

Device Implementations

Referring back to FIG. 1, environment 100 as shown includes several devices. In this case, for purposes of explanation, the devices are characterized as client devices and a cloud computing system. In this example, the client devices are manifest as a smartphone, tablet, and laptop device. However, other types of devices can serve as client devices, such as desktop computers, printers, scanners, and/or computing-enabled home appliances. Generally, so long as a device has some computational hardware, the device can act as a client device in accordance with the disclosed implementations.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and/or the datastore.

The storage/memory can be internal or external to the device. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose processor and storage/memory. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, the playback module 115 and/or recording module 114 can be installed as hardware, firmware, or software during manufacture of the device or by an intermediary that prepares the device for sale to the end user. In other instances, the end user may install these modules later, such as by downloading executable code and installing the executable code on the corresponding device.

Also note that devices generally can have input and/or output functionality. For example, computing devices can have various input mechanisms such as keyboards, mice, touchpads, voice recognition (e.g., via a microphone), gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, speakers, etc. In particular, any of the inputs and/or development actions described herein can be obtained using the aforementioned input functionality. For example, code edits and/or development tool commands may be provided using a keyboard, using voice recognition, touch gestures, gestures recognized using a depth camera, gyroscope, or accelerometer, etc.

Also note that the devices described herein can function in a stand-alone or cooperative manner to implement the described techniques. For example, the methods described herein can be performed on a single computing device and/or distributed across multiple computing devices that communicate over network(s) 160. Without limitation, network(s) 160 can include one or more local area networks (LANs), wide area networks (WANs), the Internet, and the like.

ADDITIONAL EXAMPLES

Example implementations are described above. Additional examples are described below. One example includes a method performed by a computing device. During a first development session the method can record first development actions that occur in a development environment when developing code and store the recorded first development actions in a stored representation of the first development session. During a second development session, the method can retrieve the stored representation of the first development session and replay the recorded first development actions in the development environment to reproduce the code. Responsive to a pause request, the method can pause replay of the recorded first development actions. Responsive to current development actions that cause modifications to the reproduced code, the method can cause modified code having the modifications to be stored separately from the reproduced code.

Another example includes any of the above and/or below examples where the method further causes the modified code to be compiled responsive to further second development actions received during the second development session.

Another example includes any of the above and/or below examples where, after causing the modified code to be compiled, the method receives a request to continue with playback of the first development actions, and, responsive to the request, continues with replaying the recorded first development actions from the playback point.

Another example includes any of the above and/or below examples where the development actions include text edits to the code and development environment commands provided by the development environment.

Another example includes any of the above and/or below examples where the method further comprises receiving audio data during the first development session, recording the audio data in the stored representation of the first development session, and reproducing the audio data when replaying the first development actions.

Another example includes any of the above and/or below examples where the method further receives a user input identifying a selected programming item in the reproduced code and identifies another playback point in the recorded representation that is indexed by the selected programming item. The method can also replay the recorded representation from the another playback point.

Another example includes any of the above and/or below examples where the stored representation is a chronological representation of the first development session.

Another example includes any of the above and/or below examples where identifying the another playback point includes identifying a time period that is indexed to the selected programming item in the chronological representation.

Another example includes a system having a hardware processing unit and hardware storage which stores computer-executable instructions. When executed by the hardware processing unit, the instructions cause the hardware processing unit to retrieve a stored representation of a previous development session. The stored representation identifies recorded development actions and recorded audio data from the previous development session. The instructions further cause the hardware processing unit to, during a current development session, replay the recorded development actions and the recorded audio data in the development environment. The instructions further cause the hardware processing unit to, based on at least receiving a pause request during the current development session, pause replay of the recorded development actions and the recorded audio data and store a playback point indicating where replay of the previous development session is paused.

Another example includes any of the above and/or below examples where replay of the recorded development actions causes code produced during the previous development session to be generated as reproduced code during the current development session.

Another example includes any of the above and/or below examples where the computer-executable instructions, when executed by the hardware processing unit, cause the hardware processing unit to receive current development actions that modify the reproduced code to obtain modified code and compile, build, or execute the modified code responsive to further current development actions. The instructions also cause the hardware processing unit to, based at least on receiving a request to continue with playback, store the modified code, retrieve the reproduced code, and continue with replay of the recorded development actions and audio data from the playback point.

Another example includes any of the above and/or below examples where the computer-executable instructions, when executed by the hardware processing unit, cause the hardware processing unit to cause a first source file having the reproduced code to have focus in the development environment when the recorded development actions are being replayed. The computer-executable instructions, when executed by the hardware processing unit, further can, based at least on receiving the pause request, cause a second source file to have focus in the development environment so that the current development actions are directed to the second source file.

Another example includes any of the above and/or below examples where the first source file is not modified by current development inputs received while the second source file has focus.

Another example includes any of the above and/or below examples where the computer-executable instructions, when executed by the hardware processing unit, cause the hardware processing unit to receive a user selection of a programming item that is identified in the first source file and identify another playback point in the recorded representation that is indexed by the selected programming item. The computer-executable instructions, when executed by the hardware processing unit, remove changes to the first source file that occurred after the another playback point and continue with replay of the recorded representation from the another playback point.

Another example includes any of the above and/or below examples where the recorded development actions include calls to application programming interfaces provided by the development environment.

Another example includes any of the above and/or below examples where the calls include a call to build an executable program and another call to run the executable program.

Another example includes a system comprising a hardware processing unit and also a development environment plug-in configured to be loaded by a development environment that provides application programming interfaces to the development environment plug-in. When loaded into the development environment, the development environment plug-in is further configured to execute on the hardware processing unit and retrieve a recorded representation of a previous development session. The recorded representation identifies recorded development actions from the previous development session and causes the previous development session to be replayed in the development environment by calling the application programming interfaces provided by the development environment.

Another example includes any of the above and/or below examples where the development environment plug-in is further configured to capture calls to the application programming interfaces and record the calls as individual development actions in the recorded representation.

Another example includes any of the above and/or below examples where the previous development session is a tutorial and the development environment plug-in is configured to replay audio describing the development inputs while replaying the previous development session.

Another example includes any of the above and/or below examples where the development environment plug-in is configured to retrieve the recorded representation from a source control repository.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed by a computing device, the method comprising:
   during a first development session:
      recording first development actions that occur in a development environment when developing source code, the first development actions including a command issued to the development environment to compile the source code, one or more other commands to link, debug, analyze, or run the source code, and text edits that enter a specific variable or function into the source code;

storing the recorded first development actions in a stored representation of the first development session; and storing an index that maps functions and variables defined in the source code to corresponding playback points in the stored representation;

during a second development session:

retrieving the stored representation of the first development session;

replaying the recorded first development actions as inputs to the development environment to obtain reproduced source code, the replaying including issuing a call to the development environment to compile the reproduced source code;

after the replaying has entered the specific variable or function into the reproduced source code, receiving a playback request requesting to revisit playback for the specific variable or function; and responsive to the playback request:

identifying a specific index entry in the index that maps the specific variable or function to a specific playback point in the stored representation; and replaying the recorded first development actions from the specific playback point.

2. The method of claim 1, the first development actions including further text edits that define a function call of the specific function in the source code.

3. The method of claim 1, further comprising: responsive to current development actions that cause modifications to the reproduced source code, causing modified source code having the modifications to be stored separately from the reproduced source code;

after causing the modified source code to be compiled, receiving a request to continue with playback of the first development actions; and responsive to the request to continue with playback, continuing with replaying the recorded first development actions directed to the reproduced source code from another playback point identifying where the replay was paused.

4. The method of claim 1, wherein the one or more other commands include a plurality of commands that, when replayed, cause the development environment to link, debug, analyze, and run the reproduced source code.

5. The method of claim 1, further comprising:

during the first development session:

receiving audio data identifying words spoken by a developer during the first development session; and recording the audio data in the stored representation of the first development session; and during the second development session, reproducing the audio data, including the words spoken by the developer during the first development session, when replaying the first development actions.

6. The method of claim 1, further comprising:

during the second development session:

receiving a user input identifying the specific variable or function in the reproduced source code; and responsive to the user input, displaying a menu in the development environment concurrently with the reproduced source code, the menu providing options to:

find a definition of the specific variable or function in the reproduced source code, find other references to the specific variable or function in the reproduced source code, insert a breakpoint into the reproduced source code, and provide the playback request to revisit playback for the specific variable or function, the playback request being entered via the menu.

7. The method of claim 1, wherein the stored representation is a chronological representation of the first development session.

8. The method of claim 7, further comprising:

during the second development session:

displaying an index menu in the development environment concurrently with the reproduced source code, the index menu displaying options to select:

the specific variable or function, at least one other variable defined in the reproduced source code, and at least one other function defined in the reproduced source code, the playback request being entered when the specific variable or function is selected from the index menu.

9. A system comprising: a hardware processing unit; and hardware storage storing computer-executable instructions which, when executed by the hardware processing unit, cause the hardware processing unit to:

retrieve a stored representation of a previous development session of source code, wherein the stored representation identifies recorded development actions and recorded words spoken by a developer during the previous development session, the recorded development actions including text edits that enter a specific variable or function into the source code, a compile command, and at least one of a link command, a debug command, an analysis command, or a run command;

during a current development session, replay the recorded development actions as inputs to a development environment to obtain reproduced source code while replaying the recorded words that were spoken by the developer during the previous development session;

after the specific variable or function has been replayed into the reproduced source code, receive a playback request requesting to revisit playback for the specific variable or function; and responsive to the playback request:

access an index that maps different variables and functions in the reproduced source code to corresponding playback points in the stored representation;

identify a specific index entry in the index that maps the specific variable or function to a specific playback point in the stored representation; and replay the recorded development actions from the specific playback point.

10. The system of claim 9, wherein replay of the recorded development actions from the specific playback point includes entering the specific variable or function into the reproduced source code and replaying corresponding spoken words associated with the specific variable or function.

11. The system of claim 10, wherein the computer-executable instructions, when executed by the hardware processing unit, cause the hardware processing unit to:
responsive to a pause request, pause replay of the recorded development actions and the recorded words and store another playback point indicating where replay of the previous development session is paused;
receive current development actions that modify the reproduced source code to obtain modified source code;
compile and execute the modified source code responsive to further current development actions; and
based at least on receiving a request to continue with playback, store the modified source code, retrieve the reproduced source code, and continue with replay of the recorded development actions and audio data from the another playback point.

12. The system of claim 11, wherein the computer-executable instructions, when executed by the hardware processing unit, cause the hardware processing unit to:
when the recorded development actions are being replayed, cause a first source file having the reproduced source code to have focus in the development environment; and
based at least on receiving the pause request, cause a second source file to have focus in the development environment so that the current development actions are directed to the second source file.

13. The system of claim 12, wherein the first source file is not modified by current development inputs received while the second source file has focus.

14. The system of claim 9, wherein the computer-executable instructions, when executed by the hardware processing unit, cause the hardware processing unit to:
display a menu listing a plurality of variables and functions; and
receive the playback request via a selection of the specific variable or function from the menu.

15. The system of claim 9, wherein the recorded development actions include calls to application programming interfaces provided by the development environment.

16. The system of claim 15, wherein the calls include a call to build an executable program and another call to run the executable program.

17. A computer-readable storage device storing computer-readable instructions which, when executed by one or more hardware processors, cause the one or more hardware processors to perform acts comprising:
retrieving a stored representation of a previous development session of source code, wherein the stored representation identifies recorded development actions and audio recorded during the previous development session, the recorded development actions including text edits that enter a specific variable or function into the source code, a compile command, and at least one of a link command, a debug command, an analysis command, or a run command;
during a current development session, replaying the recorded development actions as inputs to a development environment to obtain reproduced source code while replaying the audio;
receiving a playback request requesting to revisit playback for the specific variable or function; and
responsive to the playback request:
accessing an index that maps different variables and functions in the reproduced source code to corresponding playback points in the stored representation;
identifying a specific index entry in the index that maps the specific variable or function to a specific playback point in the stored representation; and
replaying, from the specific playback point, the recorded development actions and specific audio data associated with the specific variable or function.

18. The computer-readable storage device of claim 17, wherein the index is part of the stored representation of the previous development session.

19. The computer-readable storage device of claim 17, wherein the specific index entry identifies:
specific keystrokes that enter the specific variable or function into the reproduced source code, and
the specific audio data associated with the specific variable or function.

20. The computer-readable storage device of claim 19, wherein the computer-readable instructions, when executed by one or more hardware processors, cause the one or more hardware processors to perform acts comprising:
recording the previous development session to obtain the stored representation; and
generating the index.

* * * * *